(12) United States Patent
Konagai et al.

(10) Patent No.: US 12,181,289 B2
(45) Date of Patent: Dec. 31, 2024

(54) LINK INFORMATION GENERATION METHOD, LINK INFORMATION GENERATION DEVICE, AND LINK INFORMATION GENERATION PROGRAM

(71) Applicant: NIPPON TELEGRAPH AND TELEPHONE CORPORATION, Tokyo (JP)

(72) Inventors: Shunsuke Konagai, Tokyo (JP); Hiroshi Konishi, Tokyo (JP); Chihiro Yamamoto, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 17/609,308

(22) PCT Filed: May 9, 2019

(86) PCT No.: PCT/JP2019/018631
§ 371 (c)(1),
(2) Date: Nov. 5, 2021

(87) PCT Pub. No.: WO2020/225922
PCT Pub. Date: Nov. 12, 2020

(65) Prior Publication Data
US 2022/0316887 A1 Oct. 6, 2022

(51) Int. Cl.
*G07C 5/02* (2006.01)
*B60W 30/09* (2012.01)
(Continued)

(52) U.S. Cl.
CPC ......... *G01C 21/30* (2013.01); *G01C 21/3484* (2013.01)

(58) Field of Classification Search
CPC ....... G01C 21/30; G01C 21/3484; G08G 1/00
See application file for complete search history.

(56) References Cited

U.S. PATENT DOCUMENTS

2010/0138140 A1   6/2010   Okuyama
2018/0003507 A1*  1/2018   Arslan ............... G01C 21/1654

FOREIGN PATENT DOCUMENTS

JP    2002257564 A  *  9/2002
JP     200310257 A      1/2003
(Continued)

OTHER PUBLICATIONS

Machine Translation of JP-2011027634-A (Year: 2011).*
(Continued)

*Primary Examiner* — Sahar Motazedi (57) ABSTRACT

Information relating to each link based on location information of a user can be generated with high accuracy even without measuring the location information at a high frequency. A map matching unit (101) associates location information of a moving user at each time with pedestrian network data (120) formed by a plurality of nodes and links connecting the nodes through a map matching process, and a calculation unit (102) calculates a passage record of a link of interest as link information based on whether or not the link of interest is connected to preceding and succeeding links in a link row acquired by aligning the links with which the location information is associated in order of times of pieces of the location information.

20 Claims, 9 Drawing Sheets

(51) Int. Cl.
*B60W 40/08* (2012.01)
*B60W 50/02* (2012.01)
*B60W 60/00* (2020.01)
*G01C 21/30* (2006.01)
*G01C 21/34* (2006.01)

(56) References Cited

FOREIGN PATENT DOCUMENTS

| JP | 2003240591 A | | 8/2003 |
|----|--------------|---|--------|
| JP | 200733178 A | | 2/2007 |
| JP | 2007041005 A | * | 2/2007 |
| JP | 2010134538 A | | 6/2010 |
| JP | 2011027634 A | * | 2/2011 |
| JP | 2011158304 A | | 8/2011 |
| JP | 2012003343 A | * | 1/2012 |

OTHER PUBLICATIONS

Machine Translation of JP-2012003343-A (Year: 2012).*
Machine Translation of JP-2007041005-A (Year: 2007).*
Machine Translation of JP-2002257564-A (Year: 2002).*
Matsuda et al. (2004) "A Personalized Route Guidance System for Pedestrians" The IEICE Transactions A, Engineering Sciences Society, vol. J87-A, No. 1, pp. 132-139.

* cited by examiner

LINK INFORMATION GENERATION METHOD, LINK INFORMATION GENERATION DEVICE, AND LINK INFORMATION GENERATION PROGRAM

CROSS-REFERENCE TO RELATED APPLICATIONS

This application is a U.S. National Stage Application filed under 35 U.S.C. § 371 claiming priority to International Patent Application No. PCT/JP2019/018631, filed on 9 May 2019, the disclosure of which is hereby incorporated herein by reference in its entirety.

TECHNICAL FIELD

The disclosed technique relates to a link information generation method, a link information generation device, and a link information generation program.

BACKGROUND ART

In a navigation system for pedestrians, in order to perform a route search that takes into account differences among moving capabilities of users, a technique has been proposed in which a user is allowed to input, to search a route, an attribute such as "a healthy person", "using a wheelchair", "using a stroller". In this technique, a route to be selected in accordance with a user's attribute is checked in advance, and the user's attribute is associated with each route. Then, a route search is performed such that an attribute associated with a route and an input user's attribute match.

In order to reduce a cost for performing the above-described "preliminary research", it can be considered to collect location information of users with various attributes and accumulate results indicating whether each user actually has passed through a piece of a specific route (hereinafter referred to as a "link") for each user attribute. In this case, when a route search is performed, the route search can be performed such that a link through which a different user with a same attribute has passed is selected.

CITATION LIST

Non Patent Literature

Non Patent Literature 1: Matsuda Mieko, Sugiyama Hiroshi, and Doi Miwako, "A Personalized Route Guidance System for Pedestrians", The Transactions of the Institute of Electronics, Information and Communication Engineers A, Fundamentals Review J87-A(1), p. 132-139, Jan. 1, 2004.

SUMMARY OF THE INVENTION

Technical Problem

In a case where location information of a user is collected using a global positioning system (GPS) or the like mounted in a terminal device held by a user, when the location information is measured at a high frequency, the power consumption of the terminal device becomes high. For this reason, it is necessary to open a certain time interval for measuring the location information.

However, in a case where the time interval of the measurement is long, even when the location information of a user is associated with a specific link, it may not be determined whether the user has actually passed through the link from start to finish or whether the user has turned back on the way. In such cases, there is a problem in that information on such as passage records of users cannot be appropriately added to the link.

The disclosed technique is realized in view of the points described above, and an objective is to generate information relating to each link based on location information of a user with high accuracy even without measuring the location information at a high frequency.

Means for Solving the Problem

According to a first aspect of the present disclosure, a link information generation method includes: by a map matching unit, associating, by a map matching process, pieces of location information of a moving user at certain times with network data which is used for a route search for a pedestrian and formed of a plurality of nodes and a link connecting the nodes; and by a calculation unit, calculating a passage record of a link of interest as link information based on whether the link of interest is connected to a preceding link or a following link in a link row acquired by aligning links associated with the pieces of location information in chronological order of the pieces of the location information.

According to a second aspect of the present disclosure, in the link information generation method, the calculation unit can calculate passage time at nodes located at both ends of a link of interest having a passage record based on a time of the location information associated with a preceding link or a following link connected to the node, and calculate a required time for the link of interest as link information from the passage time acquired by calculating for the nodes located at both ends of the link of interest.

According to a third aspect of the present disclosure, in the link information generation method, the calculation unit can calculate, as the link information, a time cost acquired by statistical processing on a required time for the link of interest acquired by calculating based on location information of a plurality of users.

According to a fourth aspect of the present disclosure, in the link information generation method, road-type information indicated by a link is added to the link, and the calculation unit can calculate, for a link for a predetermined specific road type, a required time for a partial route including two or more links selected from the link and links connected to nodes located at both ends of the link.

According to a fifth aspect of the present disclosure, in the link information generation method, the calculation unit can calculate, as the link information, a subjective cost with a length of a link and a required time for the link as parameters.

According to a sixth aspect of the present disclosure, in the link information generation method, the calculation unit can calculate the subjective cost that further includes difficulty of walking on a road indicated by a link as a parameter.

According to a seventh aspect of the present disclosure, in the link information generation method, the calculation unit calculates the link information for attributes of the users.

According to an eighth aspect of the present disclosure, in the link information generation method, among pieces of location information at the certain times, the map matching unit makes location information whose certainty satisfies a predetermined condition correspond to the network data.

According to a ninth aspect of the present disclosure, a link information generation device includes: a map matching unit configured to associate, by a map matching process, pieces of location information of a moving user at certain times with network data which is used for a route search for a pedestrian and formed of a plurality of nodes and a link connecting the nodes; and a calculation unit configured to calculate a passage record of a link of interest as link information based on whether the link of interest is connected to a preceding link or a following link in a link row acquired by aligning a plurality of the links associated with the pieces of location information in chronological order of the location information.

According to a tenth aspect of the present disclosure, there is provided a link information generation program causing a computer to function as: a map matching unit configured to associate, by a map matching process, location information of a moving user at certain times with network data which is used for a route search for a pedestrian and formed of a plurality of nodes and a link connecting the nodes; and a calculation unit configured to calculate a passage record of a link of interest as link information based on whether the link of interest is connected to a preceding link or a succeeding link in a link row acquired by aligning the links associated with the pieces of location information in chronological order of the location information.

Effects of the Invention

According to the disclosed technique, information relating to each link based on location information of a user can be generated with high accuracy even without measuring the location information at a high frequency.

DESCRIPTION OF EMBODIMENTS

Hereinafter, one example of the embodiments of the disclosed technique will be described with reference to the drawings. In the drawings, the same reference numerals are given to the same or equivalent constituent elements and parts. In addition, dimensional ratios in the drawings are exaggerated for the convenience of description and thus may be differ from actual ratios.

First Embodiment

Figure 1:
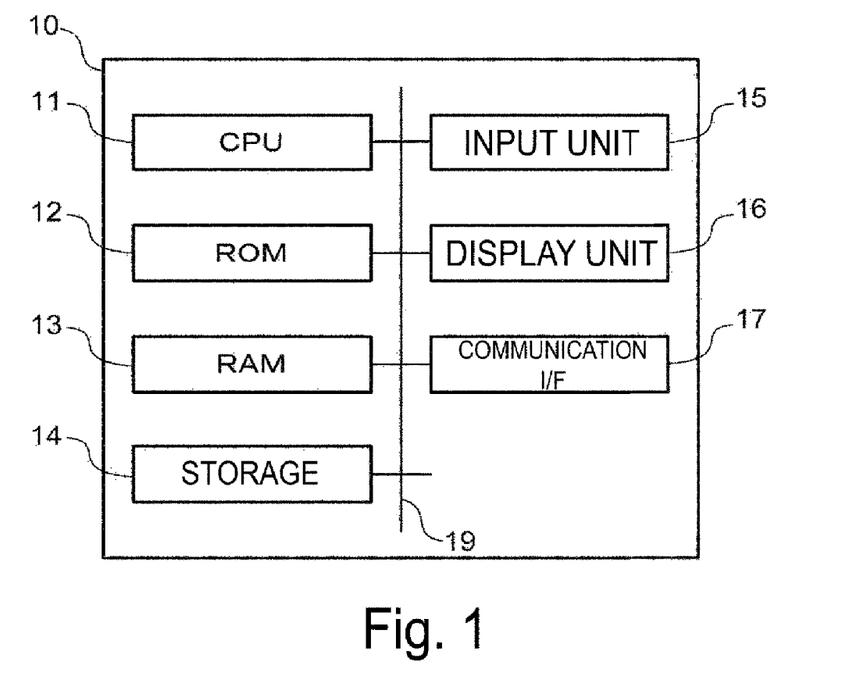
FIG. 1 is a block diagram illustrating a hardware configuration of a link information generation device according to first and second embodiments.

FIG. 1 is a block diagram illustrating a hardware configuration of a link information generation device 10 according to a first embodiment. As illustrated in FIG. 1, the link information generation device 10 includes a central processing unit (CPU) 11, a read only memory (ROM) 12, a random access memory (RAM) 13, a storage 14, an input unit 15, a display unit 16, and a communication interface (IF) 17. The components are communicatively interconnected through a bus 19.

The CPU 11 is a central processing unit that executes various programs and controls each unit. In other words, the CPU 11 reads a program from the ROM 12 or the storage 14 and executes the program using the RAM 13 as a work area. The CPU 11 performs control of each of the components described above and various arithmetic operation processes in accordance with a program stored in the ROM 12 or the storage 14. In the present embodiment, a link information generation program to be described below is stored in the ROM 12 or the storage 14.

The ROM 12 stores various programs and various kinds of data. The RAM 13 is a work area that temporarily stores a program or data. The storage 14 includes a hard disk drive (HDD) or a solid state drive (SSD) and stores various programs including an operating system and various kinds of data.

The input unit 15 includes a pointing device such as a mouse and a keyboard and is used for performing various inputs.

The display unit 16 is, for example, a liquid crystal display and displays various kinds of information. The display unit 16 may employ a touch panel system and function as the input unit 15.

The communication interface 17 is an interface for communicating with other devices and, for example, uses a standard such as Ethernet (registered trademark), FDDI, or Wi-Fi (registered trademark).

Next, a functional configuration of the link information generation device 10 will be described.

Figure 2:
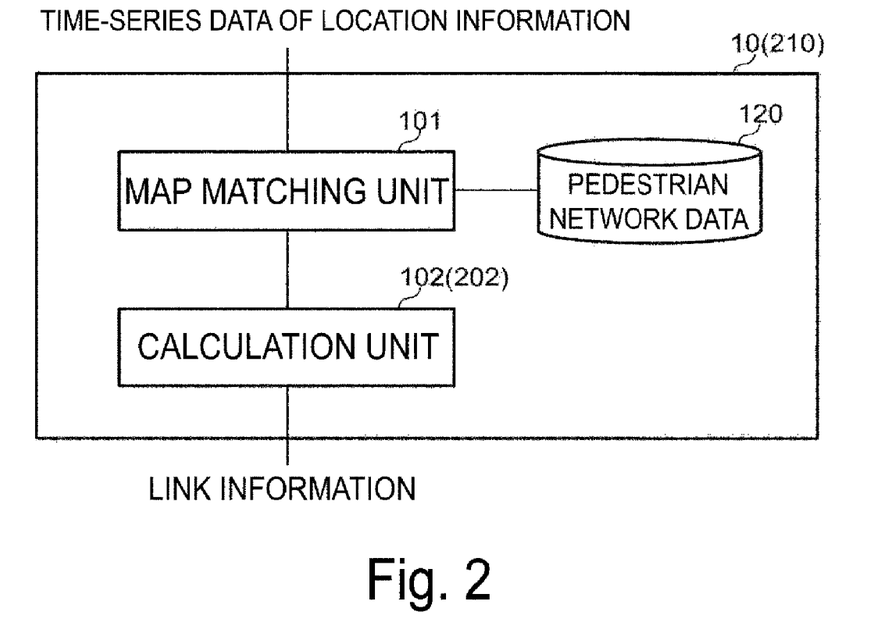
FIG. 2 is a block diagram illustrating an example of a functional configuration of the link information generation device according to the first and second embodiments.

FIG. 2 is a block diagram illustrating an example of the functional configuration of the link information generation device 10. As illustrated in FIG. 2, the link information generation device 10 includes a map matching unit 101 and a calculation unit 102 as functional components. In addition, pedestrian network data 120 is stored in a predetermined storage area of the link information generation device 10. Each functional component is realized by the CPU 11 reading a link information generation program stored in the ROM 12 or the storage 14, expanding the link information generation program in the RAM 13 to execute the program.

Figure 3:
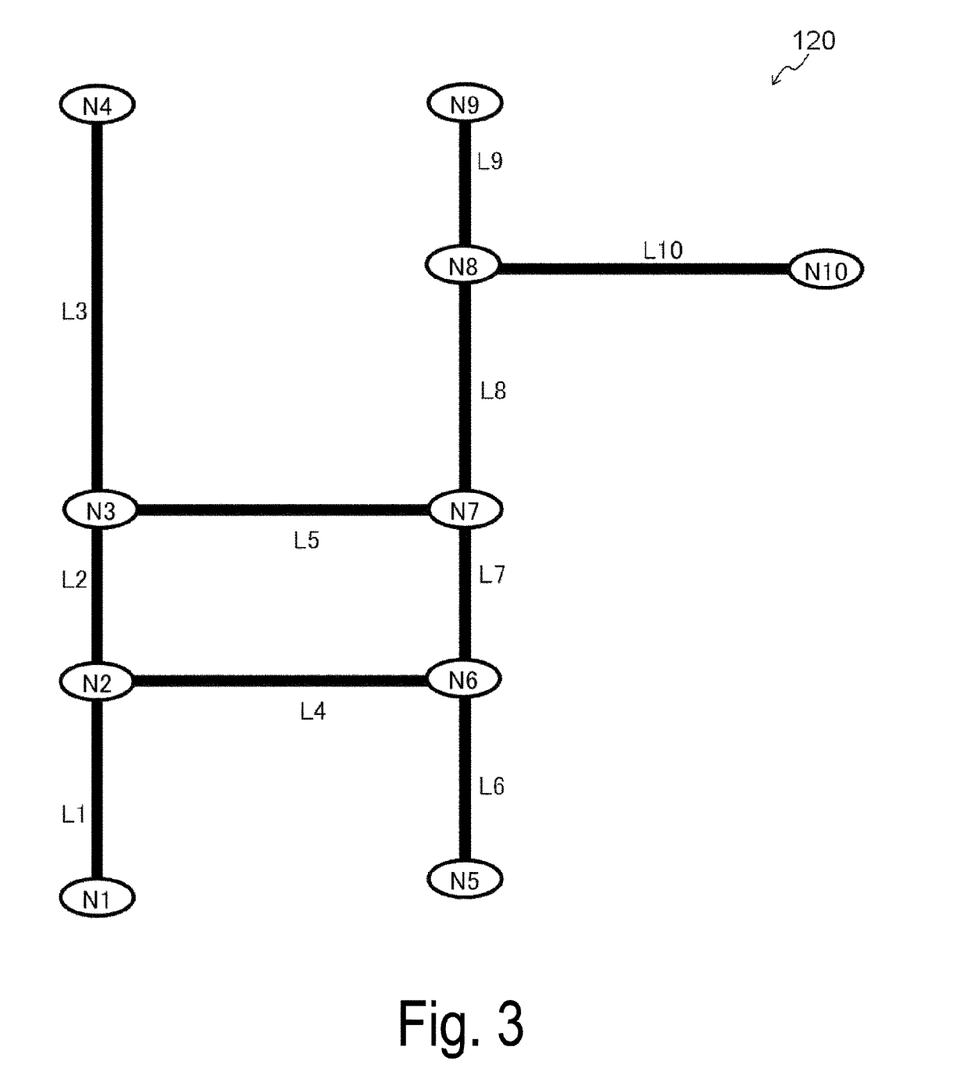
FIG. 3 is a schematic diagram illustrating an example of pedestrian network data.

The pedestrian network data 120 is network data used for a route search for a pedestrian and represents a road network using a plurality of nodes and links connecting the nodes. FIG. 3 is a schematic diagram of the pedestrian network data 120. In the example illustrated in FIG. 3, each node is denoted by an oval, and each link is denoted by a connection line between nodes. Further, symbols Ni (in the example illustrated in FIG. 3, i=1, 2, . . . , 10) in the ovals indicate a node number, and symbols Lj (in the example illustrated in FIG. 3, j=1, 2, . . . , 10) written together with a link indicate a link number. Hereinafter, a node having a node number Ni will be referred to as "node Ni", and a link having a link number Lj will be referred to as "link Lj."

Figure 4:
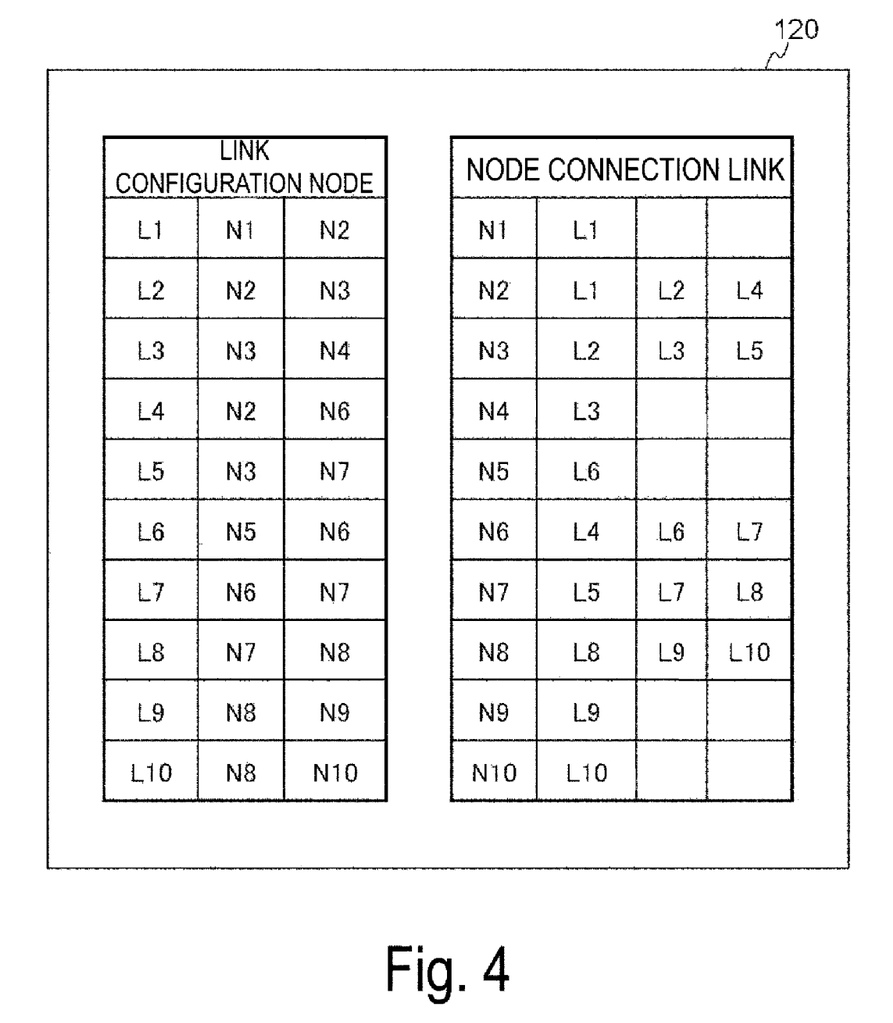
FIG. 4 is a diagram illustrating a data structure of the pedestrian network data.

FIG. 4 illustrates a data structure of the pedestrian network data 120. As illustrated in FIG. 4, the pedestrian network data 120 includes information on link configuration nodes and node connection links. The link configuration node is information in which a link number of a link and node numbers of nodes disposed at both ends of the link are associated with each other, and each node connection link is information in which a node number of a node and a link number of a link connected to the node are associated with each other.

The map matching unit 101 acquires time-series data of location information of a moving user at certain times, in other words, location information measured at each time that is a measurement point (hereinafter, simply referred also to as a "point").

The location information is measured, for example, by a GPS or the like mounted in a mobile terminal carried by a user and is input to the link information generation device 10 in association with a measurement time. The location information is, for example, latitude, longitude, and altitude.

Figure 5:
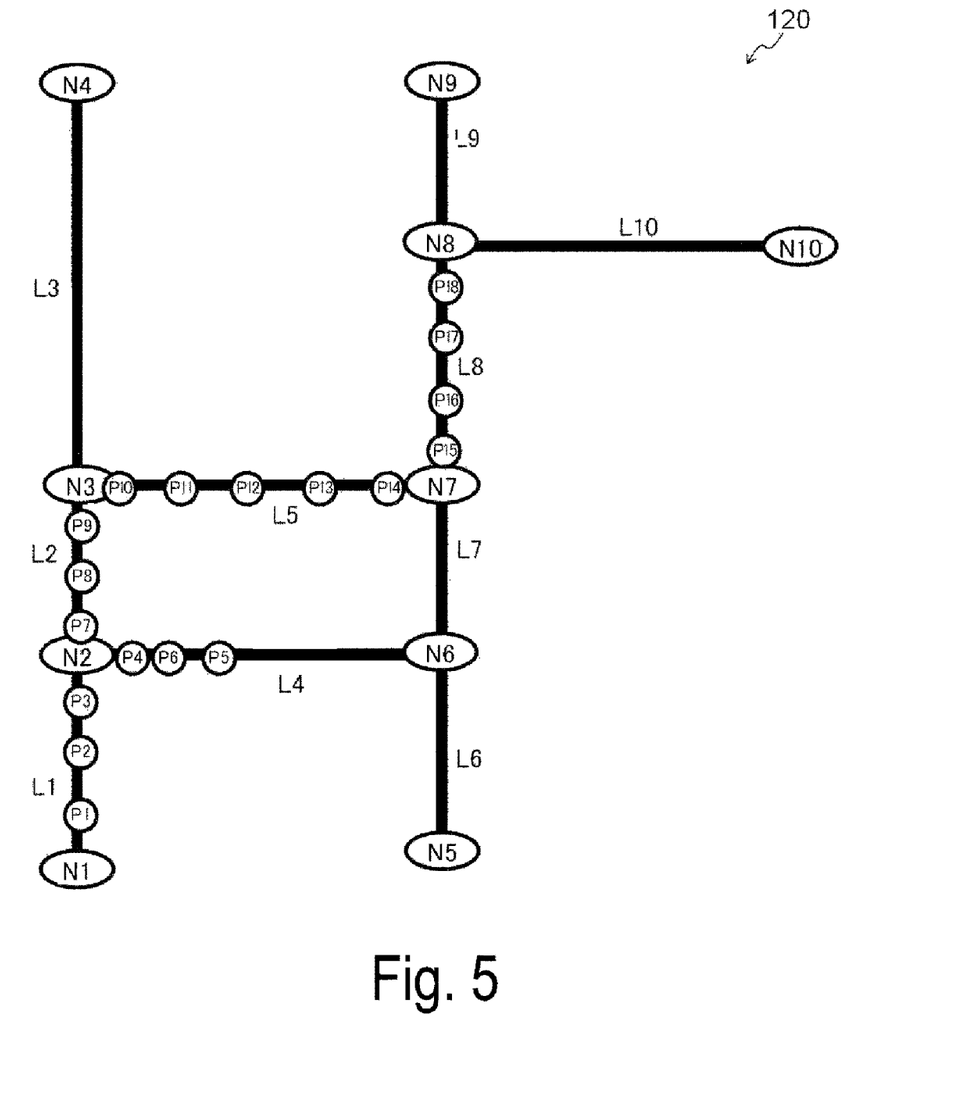
FIG. 5 is a diagram illustrating an example of location information associated with the pedestrian network data.

The map matching unit 101 associates location information of each point configuring the acquired time-series data with a link of the pedestrian network data 120 through a map matching process. FIG. 5 illustrates an example of location information associated with the pedestrian network data 120 by the map matching unit 101. In the example illustrated in FIG. 5, location information associated with a link is denoted by circles, and symbols Pk (in the example illustrated in FIG. 5, k=1, 2, . . . , 18) in the circles are a point number. In the example illustrated in FIG. 5, point numbers P1, P2, . . . , P18 are added in the order of the times when measurement is performed at the points. Hereinafter, a point having a point number Pk will be denoted as "point Pk".

The calculation unit 102 calculates information relating to a link (hereinafter referred to as "link information") that can be used at the time of a route search for each link of the pedestrian network data 120. In the first embodiment, the calculation unit 102 calculates passage records of links as the link information.

More specifically, the calculation unit 102 creates a link row in which links associated with pieces of location information are aligned in the order of the times when the location information is measured. Then, the calculation unit 102 calculates passage records of a link to be calculated for the passage records is calculated (hereinafter referred to as a "link of interest") based on whether the link of interest is connected to a subsequent link in the link row.

Figure 6:
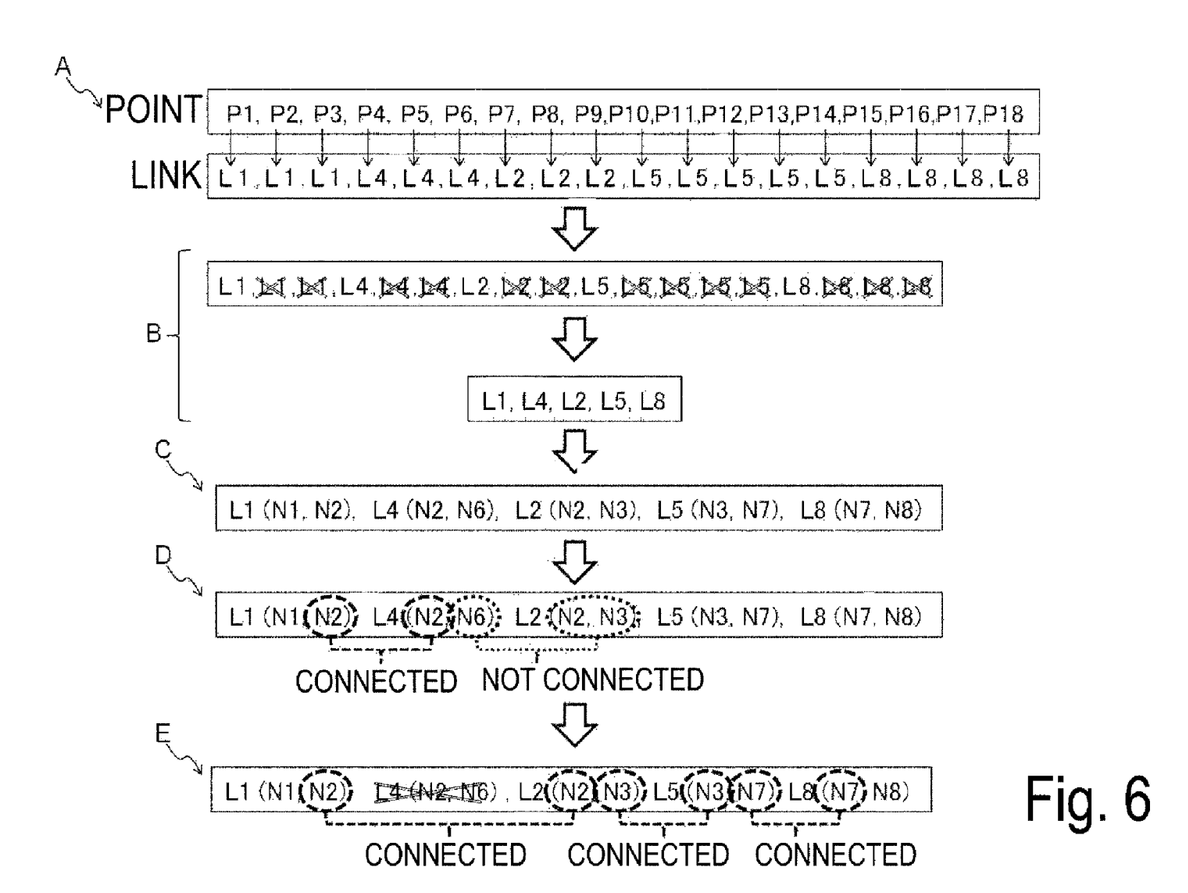
FIG. 6 is a diagram illustrating calculation of passage records of each link.

More specifically, as illustrated in A of FIG. 6, the calculation unit 102 extracts link numbers of links associated with the location information of each point. In addition, as illustrated in B of FIG. 6, the calculation unit 102 aligns the extracted link numbers in the order of the time when the location information corresponding to the extracted link number is measured, and creates a link row in which one of the same link numbers that consecutively appear is left, and the rest are deleted.

Furthermore, as illustrated in C of FIG. 6, the calculation unit 102 acquires node numbers of nodes disposed at both ends of each of the links represented by the link numbers included in the link row from the information of the link configuration nodes of the pedestrian network data 120.

In addition, the calculation unit 102 determines, in a created link row, whether a link positioned before the link of interest (hereinafter, also referred to as a "preceding link") and a link positioned after the link of interest (hereinafter also referred to as a "following link") are connected to the link of interest. In a case where a common node number is included in the link configuration nodes of two links, the calculation unit 102 can determine that the two links are connected to each other.

In the example of D of FIG. 6, when the link of interest is a link L4, the link 4 is determined to be connected to the preceding link L1 because a common node N2 exists with the preceding link L1. On the other hand, the link 4 is determined not to be connected to the following link L2 because a common node does not exist. To determine the connection with the following link, it is determined whether or not a node ("N6" in the example of D of FIG. 6) other than the node used when the connection to the preceding link is determined ("N2" in the example illustrated in D of FIG. 6) and any one of the link configuration nodes of the following link (in the example illustrated in D of FIG. 6, "N2" and "N3") are common among the link configuration nodes of the link of interest.

The calculation unit 102 deletes the link number of the link of interest that is not connected to the preceding link or the following link from the link row, configures the following link as a new link of interest, and determines whether the new link of interest is connected to a preceding link and a succeeding link. As illustrated in E of FIG. 6, the calculation unit 102 configures each link as the link of interest to perform the determination described above, and adds a predetermined value (for example, "1") to a passage record of the link connected to both the preceding link and the succeeding link.

For example, as illustrated in FIG. 5, although a user turned back on the way along the link L4 without passing through the link L4, in a case where location information is measured at a low frequency, the location information associated with the link is sparse, and thus it is difficult to distinguish between passing and turning back. In the present embodiment, as described above, highly accurate link information can be generated by adding a passage record for a link connected to both a preceding link and a following link, and highly accurate link information can be generated by not adding the passage record for a link on which a user has turned back on the way without passing through the link.

Next, operations of the link information generation device 10 according to the first embodiment will be described.

Figure 7:
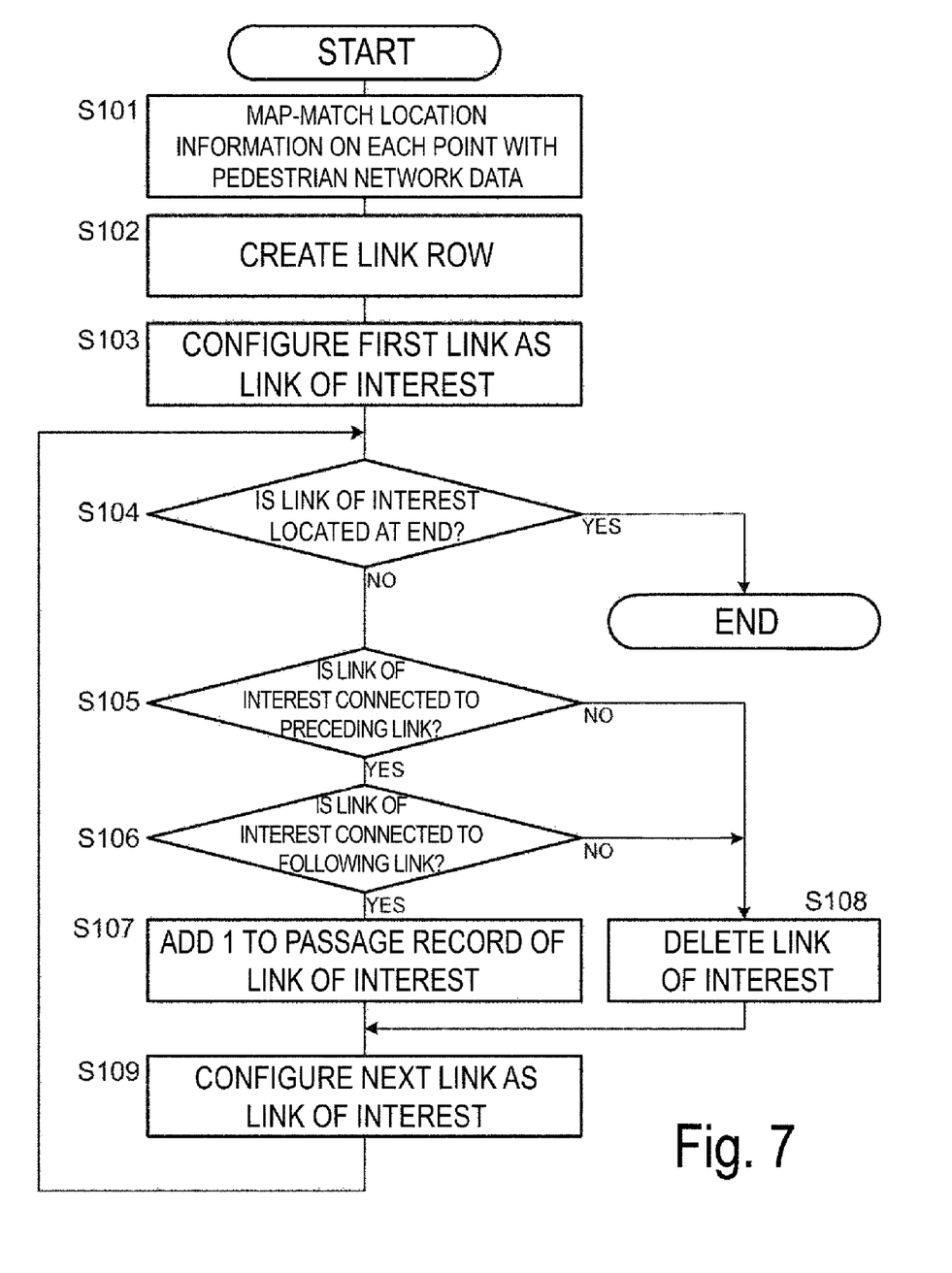
FIG. 7 is a flowchart illustrating a flow of a link information generation process according to the first embodiment.

FIG. 7 is a flowchart illustrating the flow of the link information generation process performed by the link information generation device 10. The CPU 11 reads the link information generation program from the ROM 12 or the storage 14, expands the link information generation program into the RAM 13 to execute, whereby the link information generation process is performed.

In step S101, the CPU 11 acquires time-series data of the location information input to the link information generation device 10 as the map matching unit 101. Then, the CPU 11 associates location information of each point with one link of the pedestrian network data 120 through a map matching process as the map matching unit 101.

Next, in step S102, the CPU 11 serves as the calculation unit 102. The CPU 11 extracts the link number of the link to which the location information of each point is associated, aligns in order of the measurement time of location information, and creates a link row in which one of the same link numbers that appear consecutively is left and the rest are deleted.

Next, in step S103, the CPU 11 serves as the calculation unit 102, and the CPU 11 configures the link of a first link number in the link row as a link of interest.

Next, in step S104, the CPU 11 serves as the calculation unit 102, and the CPU 11 determines whether or not the link of interest is located at the end of the link row. In a case where the link of interest is not located at the end, the process proceeds to step S105.

In step S105, the CPU 11 serves as the calculation unit 102, and the CPU 11 determines whether or not the link of interest is connected to a preceding link in the created link row. In a case where the preceding link of the link of interest is deleted in the process of step S108 to be described below, as illustrated in E of FIG. 6, the link located before the deleted link is set as the preceding link of the link of interest, and whether the link is connected to the link of interest is determined. In a case where a node common to the link configuration nodes of both links is included, it is determined that the links are connected, and the process proceeds to step S106. If the links are not connected, the process proceeds to step S108.

In step S106, the CPU 11 serves as the calculation unit 102 to determine whether or not the link of interest is connected to a following link in the created link row. When the link of interest is connected to the following link, the process proceeds to step S107. When the link of interest is not connected to the following link, the process proceeds to step S108.

In step S107, the CPU 11 serves as the calculation unit 102, and the CPU 11 adds a predetermined value (for example, "1") to a passage record of the link of interest.

On the other hand, in step S108, the CPU 11 serves as the calculation unit 102, and the CPU 11 deletes the link number of the link of interest from the link row.

Next, in step S109, the CPU 11 serves as the calculation unit 102, and the CPU 11 configures a link of a next link number in the link row as the link of interest, and the process returns to step S104. In step S104, when the link number of the link of interest is determined as being located at the end in the link row, the link information generation process ends.

By repeating the link information generation process described above for time-series data of location information of a plurality of users that are input to the link information generation device 10, information on a passage record of each link is accumulated.

As described above, in the link information generation device according to the first embodiment, the map matching unit associates the timeseries data of the user's location information with pedestrian network data by a map matching process. Then, in a link row in which the links with which the pieces of location information of points are associated are aligned in order of the measurement times, a passage record of the link of interest is calculated based on whether or not the link of interest is connected to a preceding link and a following link with a node. As a result, link information of each link based on the user's location information can be generated with high accuracy even without performing the measurement of the location information at a high frequency.

In this way, even in a case where the location information is sparse, the link information can be generated with high accuracy, and thus some of the acquired location information may be deleted. More specifically, of the location information included in the time-series data of the user's location information, link information such as a link passage record may be generated by using only the location information in which the certainty of the location information satisfies a predetermined condition. For example, reliability information such as a radio wave intensity at the time of measuring location information using a GPS may be collected together with the location information, and among a series of location information groups, location information having a reliability of a predetermined value or more can be used.

Furthermore, in the first embodiment described above, information relating to attributes of users such as "healthy person", "using a wheelchair", "using a stroller", and the like may also be acquired together with time-series data of user's location information, and the passage record of each link may be calculated for each user attribute. Accordingly, in a route search using the pedestrian network data, by selecting links that has been passed by a user with the same attributes as the user who wants to search for a route, an appropriate route search according to a user's attribute can be performed.

Second Embodiment

In a second embodiment, a case where a time required for passing through each link is also calculated in addition to a passage record of each link as link information will be described. The hardware configuration of a link information generation device according to the second embodiment is similar to the hardware configuration of the link information generation device 10 according to the first embodiment illustrated in FIG. 1, and thus description thereof will be omitted.

As illustrated in FIG. 2, a link information generation device 210 includes a map matching unit 101 and a calculation unit 202 as functional components. In addition, pedestrian network data 120 is stored in a predetermined storage area of the link information generation device 210.

Figure 8:
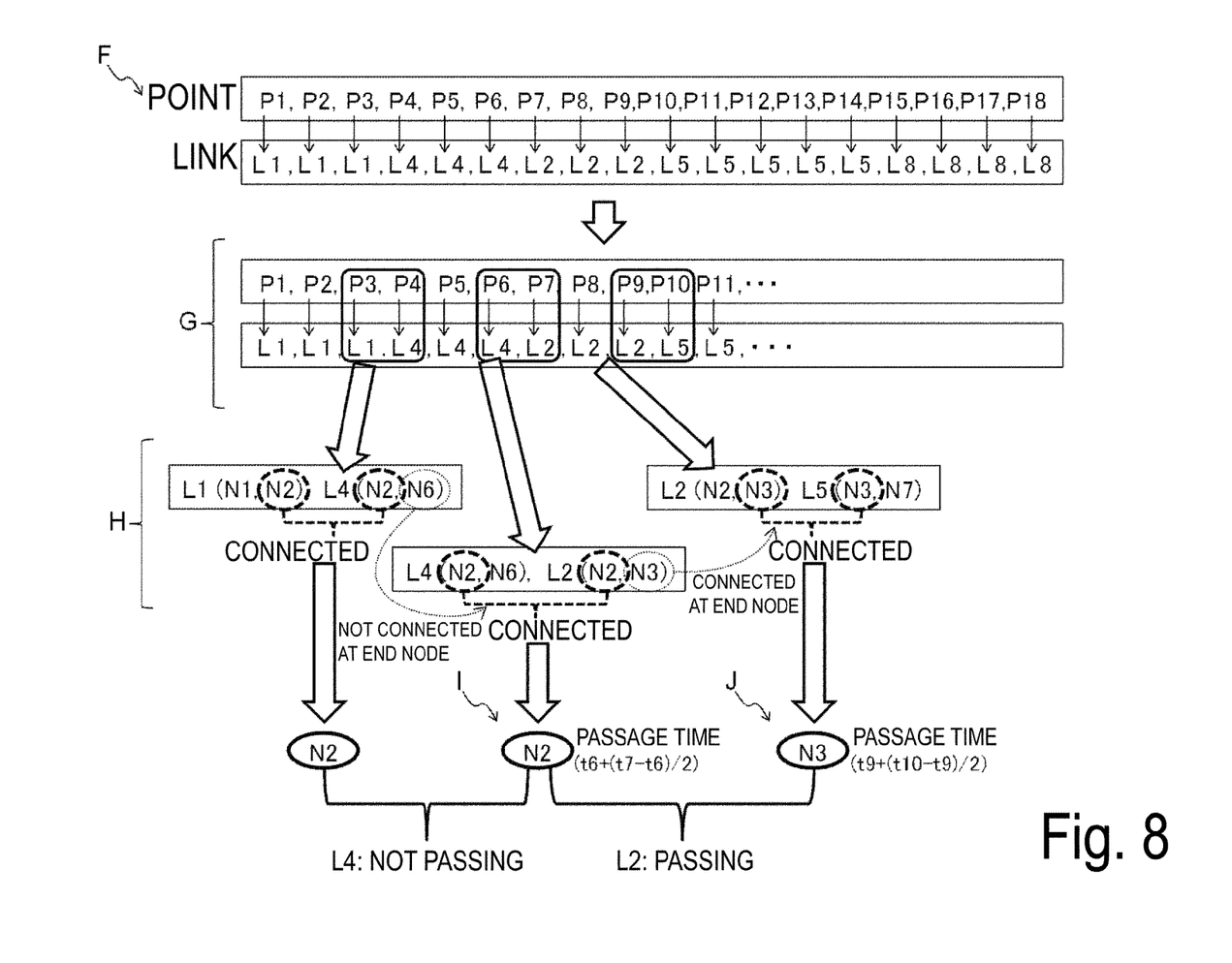
FIG. 8 is a diagram illustrating calculation of passage records and a required time of each link.

As illustrated in F of FIG. 8, the calculation unit 202 extracts link numbers of links with which location information of each point is associated and aligns the extracted link numbers in order of measurement time of the corresponding location information and creates a link row formed of sets of a point number and a link number.

In addition, in the link row, the calculation unit 202 calculates passage time at nodes located at both ends of the link of interest based on the times of pieces of location information associated with a preceding link and a succeeding link connected to the nodes, and calculates the time required for the link of interest from the passage times acquired by calculating for the nodes located at both ends of the link of interest.

More specifically, as illustrated in G of FIG. 8, the calculation unit 202 determines whether or not a point for which the passage time is calculated (hereinafter, referred to as a "point of interest") is a change point. The change point is a point where a link of the point of interest and a link of a point following the point of interest are different. For example, in the example illustrated in G of FIG. 8, in a case where the point of interest is set to a point P6, a link of the point P6 is L4, and a link of a following point P7 is L2, and thus, the point of interest P6 can be determined as being a change point.

As illustrated in H of FIG. 8, for the point of interest that is the change point, the calculation unit 202 determines whether or not a link of the point of interest and a link of a following point are connected. The method for determining the connection of a link is similar to that of the first embodiment. In a case where both links are connected the calculation unit 202 sets a node connecting both the links (hereinafter, referred to as a "connection node") as a start node, sets a link of the following point as a target link, and calculates a passage time at the start node of the target link (hereinafter, referred to as a "start point passage time").

More specifically, the calculation unit 202 calculates a time between a latest time of location information associated with the link of the point of interest and an oldest time of location information associated with the target link, for example, an intermediate time as the start point passage time. For example, in a case where the point of interest is the point P6, as illustrated in I of FIG. 8, a start node becomes the node N2. Then, as described below, the start point passage time at the target link L2 is calculated from a time t6 of the latest point P6 associated with the link L4 of the point of interest P6 and a time t7 of the oldest point P7 associated with the target link L2.

The start point passage time at the target link L2=t6+(t7−t6)/2

In addition, as illustrated in J of FIG. 8, the calculation unit 202 sets a node other than a start node as an end node among the nodes located at both ends of the target link. Then, in a case where the target link is connected to the following link at an end node, the calculation unit 202 calculates a passage time at the end node of the target link (hereinafter referred to as an "end point passage time"). A method for calculating the end point passage time is similar to that of the case of the start point passage time. In addition, the calculation unit 202 calculates a required time of the target link by subtracting the start point passage time from the end point passage time. Furthermore, the calculation unit 202 adds a predetermined value (for example, "1") to the passage record of the target link for which the end point passage time has been calculated.

In this way, a start point passage time is calculated in a case where the target link is connected to a following link, and an end point passage time is calculated in a case where the target link is connected to the following link at the end node. In this way, for example, for a link, such as the link L4, that has not been passed because a user turned back on the way, the passage time at the end node is not calculated, and thus, a required time is not calculated, and the passage record is not added. In addition, by calculating the passage time while making the determination described above, even when a link, such as the link L4, that is turned back on the way is included, the passage time can be calculated using the time of the location information immediately before entering the following link.

Next, operations of the link information generation device 210 according to the second embodiment will be described.

Figure 9:
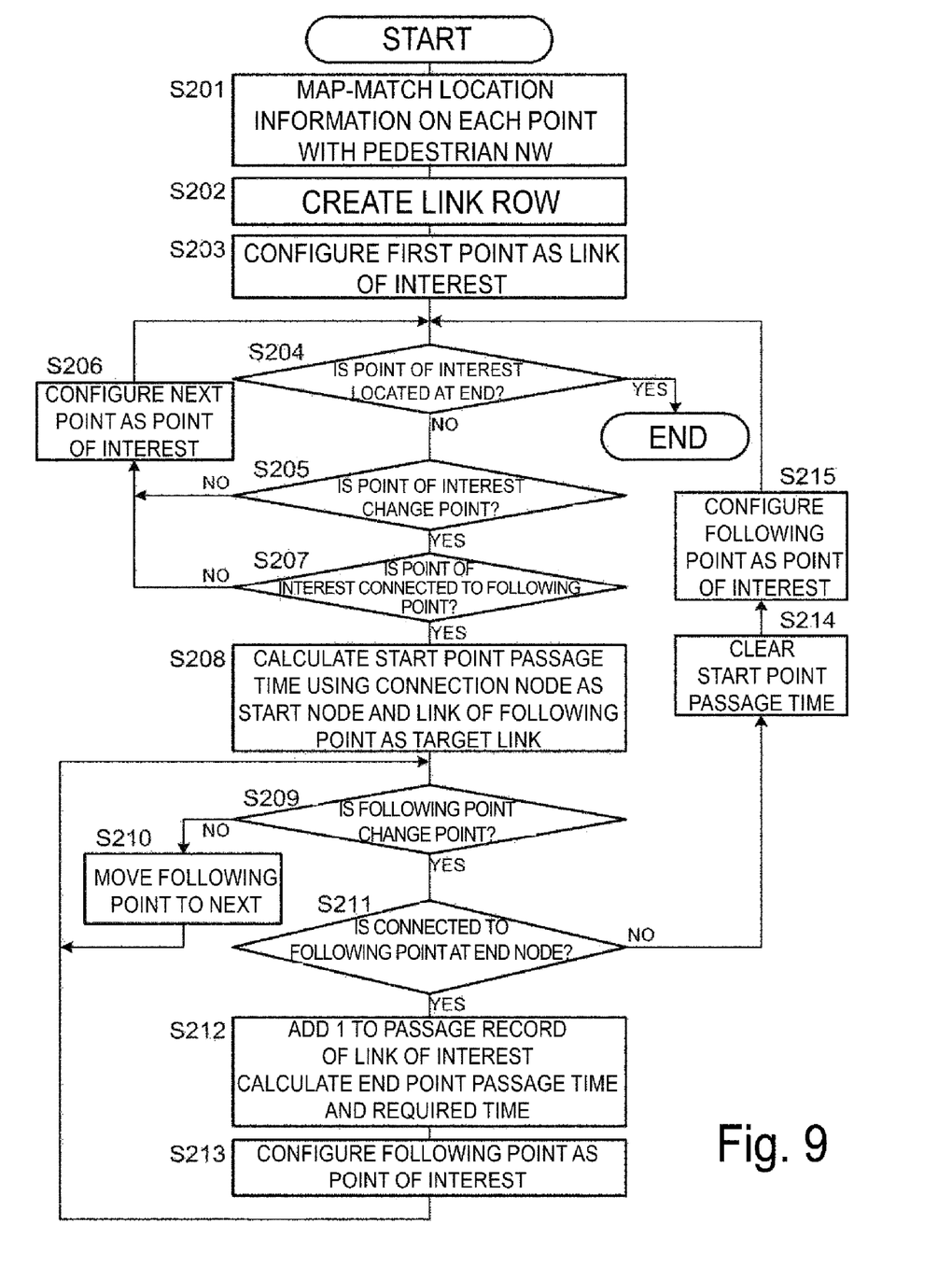
FIG. 9 is a flowchart illustrating the flow of a link information generation process according to the second embodiment.

FIG. 9 is a flowchart illustrating the flow of a link information generation process performed by the link information generation device 210. The CPU 11 reads the link information generation program from the ROM 12 or the storage 14, expands the link information generation program into the RAM 13, and executes the link information generation program, whereby the link information generation process is performed.

In step S201, the CPU 11 acquires time-series data of the location information input to the link information generation device 210 as the map matching unit 101. Then, the CPU 11 serves as the map matching unit 101, and the CPU 11 associates the location information of each point with any link of the pedestrian network data 120 through a map matching process.

Next, in step S202, the CPU 11 serves as the calculation unit 202, and the CPU 11 extracts link numbers of links to which location information of each point is associated. Then, the CPU 11 serves as the calculation unit 202. The CPU 11 aligns the extracted link numbers in the order of measurement time of the corresponding location information and creates a link row formed of sets of point numbers and associated link numbers.

Next, in step S203, the CPU 11 serves as the calculation unit 202 and configures a first point in the link row as a point of interest.

Next, in step S204, the CPU 11 serves as the calculation unit 202 and determines whether or not a point of interest is located at the end of the link row. In a case where the point of interest is not located at the end, the process proceeds to step S205.

In step S205, the CPU 11 serves as the calculation unit 202 and determines whether or not the point of interest is a change point. When the point of interest is a change point, the process proceeds to step S207. When the point of interest is not a change point, the process proceeds to step S206.

In step S206, the CPU 11 serves as the calculation unit 202 and configures a next point in the link row as the point of interest, and the process returns to step S204.

On the other hand, in step S207, the CPU 11 serves as the calculation unit 202 and determines whether or not a link of the point of interest and a link of a following point are connected. When the link of the point of interest and the link of the following point are connected, the process proceeds to step S208. when such links are not connected, the process proceeds to step S206.

In step S208, the CPU 11 serves as the calculation unit 202 and sets a connection node as a start node and sets the link of the following point as a target link. Then, the CPU 11 serves as the calculation unit 202 and calculates a time between a latest time of location information associated with the link of the point of interest and an oldest time of location information associated with the target link, for example, an intermediate time, as a start point passage time at the target link.

Next, in step S209, the CPU 11 serves as the calculation unit 202 and determines whether or not the following point of the point of interest is a change point. When the succeeding point is a change point, the process proceeds to step S211. When the following point is not a change point, the process proceeds to step S210.

In step S210, the CPU 11 serves as the calculation unit 202 and moves the following point to the next point in the link row, and the process returns to step S209.

Meanwhile, in step S211, the CPU 11 serves as the calculation unit 202 and determines whether or not the following point is an end node of the target link, and the target link is connected to a following link at the end node. When the target link is connected to the following link at the end node, the process proceeds to step S212. When the target link is not connected to the following link at the end node, the process proceeds to step S214.

In step S212, the CPU 11 serves as the calculation unit 202 and adds a predetermined value (for example, "1") to the passage record of the target link. In addition, the CPU 11 serves as the calculation unit 202 and calculates an end point passage time at the target link and calculates a required time of the target link by subtracting the start point passage time calculated in step S208 from the end point passage time.

Next, in step S213, the CPU 11 serves as the calculation unit 202 and configures the following point as the point of interest, and the process returns to step S209.

Meanwhile, in step S214, the CPU 11 serves as the calculation unit 202 and clears the start point passage time calculated in step S208.

Next, in step S215, the CPU 11 serves as the calculation unit 202 and configures a following point as the point of interest, and the process returns to step S204.

In step S204, when the point of interest is determined to be located at the end of the link row, the link information generation process ends.

By repeating the above-described link information generation process for the time-series data of location information of a plurality of users input to the link information generation device 210, information of the passage record and a required time of each link are accumulated. The calculation unit 202 performs statistical processing on the accumulated required times and calculates a time cost of each link. The time cost calculated by statistical processing, for example, can be such as an average time of required time calculated for each of a plurality of users, an average value excluding outliers based on a standard deviation, a median value, and a maximum frequency after quantization.

As described above, when each link corresponding to a point to be a change point is connected to a following link, the link information generation device according to the second embodiment calculates a start point passage time using the following link as a target link. In addition, in a case where the target link is connected to the following link at the end node, the link information generation device adds the passage record of the target link and calculates an end point passage time and a required time. In accordance with this, link information of each link based on the user's location information can be generated with high accuracy even without measuring the location information at a high frequency.

In this way, by adding a time cost based on a required time to each link, at the time of searching a route, a route that minimizes the time cost can be searched instead of the shortest route. For example, on a barrier-free route or the like, even if the distance is long, there may be a route that can shorten the required time for users of such as wheelchairs and strollers, and an effective route search can be performed by using the time cost.

In addition, as in the first embodiment, link information such as a link passage record and a required time may be generated using only the location information of which certainty of the location information satisfies a predetermined condition in the location information included in the time-series data of user's location information.

Furthermore, as in the first embodiment, a passage record and a time cost of each link may be calculated for each attribute of users.

In addition, in the second embodiment, when a time cost of each link is calculated, a time cost with signal waiting accompanied with road crossing and stairs of a pedestrian bridge taken into account may be calculated. More specifically, to each link of the pedestrian network data 120, information on a road type represented by the link is assigned in advance. The calculation unit 202 calculates a required time of a partial route including two or more links selected from links of predetermined specific road types such as a "pedestrian crossing" and a "pedestrian bridge" and links connected to nodes located at both ends of the links. Then, the calculation unit 202 calculates a time cost for each partial route by performing statistical processing on the required time calculated from the time-series data of the location information of a plurality of users.

Figure 10:
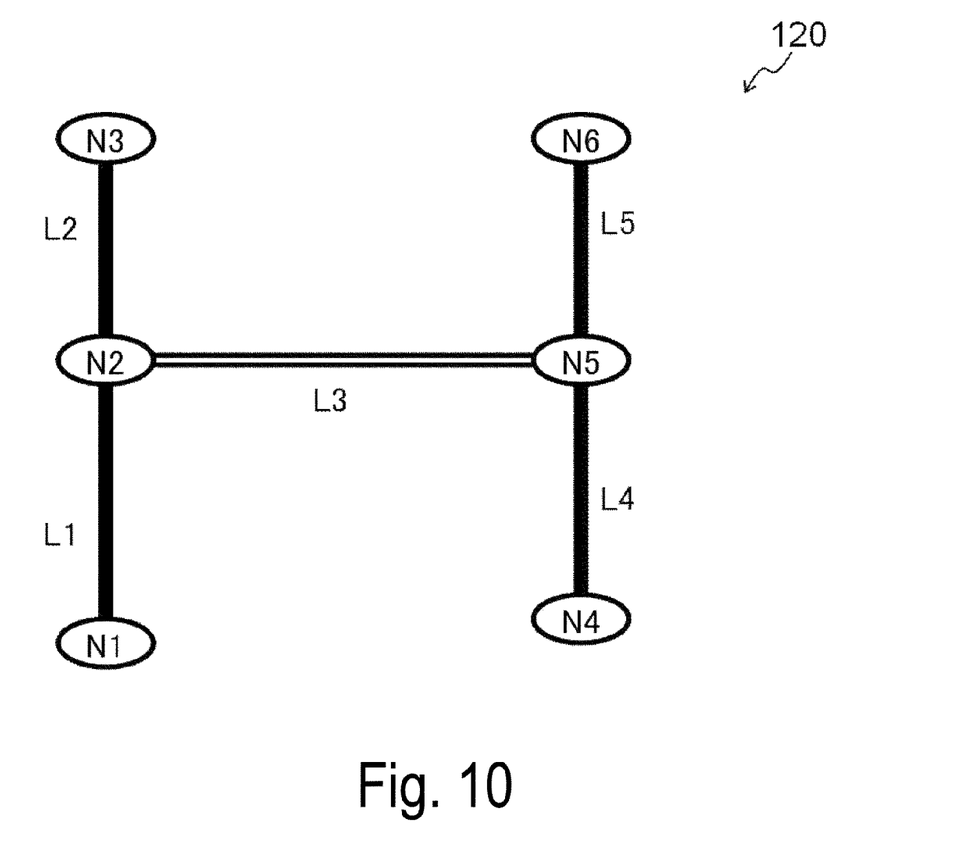
FIG. 10 is a schematic diagram illustrating an example of pedestrian network data including links for a specific road type.

For example, in the pedestrian network data 120 as illustrated in FIG. 10, the road type of the link L3 is a "pedestrian crossing" or a "pedestrian bridge". In this case, the calculation unit 202 calculates a required time of each partial route formed of a combination of links represented below.

L1+L2, L1+L3+L4, L1+L3+L5, L2+L3+L4 L2+L3+L5, L4+L3+L1, L4+L3+L2, L5+L3+L1 L5+L3+L2, L4+L5

By regarding each partial route as one link, the required time can be calculated as in the second embodiment. The calculation unit 202 calculates a time cost of each partial route by performing statistical processing on required times calculated from the time-series data of location information of a plurality of users. At the time of searching for a route, a route that minimizes the time cost of the entire route is searched using a time cost added to each partial route.

In addition, as described above, in a case where a barrier-free route search is performed, by using a time cost added to each link, a route that takes the shortest required time for the entire route can be searched However, the route that takes the shortest required time for the entire route does not necessarily match the route that the user can pass most easily in user's subjectivity. The degree of difficulty based on user's subjectivity is considered to be inversely correlated with a movement speed and be correlated with the length of the link. This can be represented for a link Lj as described below using a length Dj, a required time Tj, and a movement speed DjTj at the time of passage.

$$Cj = \alpha Tj/Dj \times \beta Dj = ATj \text{ (here, } \alpha, \beta, \text{ and } A \text{ are coefficients)}$$

It is presumed that it is easier to match the user's subjectivity when A is set to a linear function with difficulty working on the road corresponding to the link, that is, the height and length of the load when passing as a parameter than when A is set as a constant.

For example, the height of the load can be represented using a ratio of the movement speed DjTj of the link Lj to the movement speed of a flat link. As one example of user's subjectivity, in some cases, although a link with high load, that is, a link with a slow movement speed is used if the link is extremely short, even when the long is long, it is considered that a link with load, that is a link with high movement speed, is preferable even if it takes a little detour and a long time when the link is long to some extent.

Thus, as described below, the calculation unit 202 calculates a subjective cost Cj including the load of a link in a parameter for each link.

$$Cj = f(\text{difficulty}, Dj)Tj$$

f(difficulty, Dj) is a linear function whose parameters are the degree and the length of a load that is represented using a ratio of the movement speed Dj/Tj of the link Lj to the movement speed of a flat link or the like.

In addition, f(difficulty, Lj) may be a different function depending on user's attribute. For example, f(difficulty, Dj) may be a function representing that a subjective load received from a route with high load increases geometrically with respect to the length, and the degree of the increase can be different depending on user's attribute.

The subjective cost Cj is not limited to the case of calculating using the above-described functions, and the subjective cost Cj may be derived from a two-dimensional table in which the values of Cj corresponding to f(difficulty, Dj) and Tj are predetermined.

In addition, in the embodiments described above, information such as a passage record and the like of each link may be calculated to update the information added to the link of the pedestrian network data, based on time-series data of location information of users acquired in real time. In such a case, for example, by using passage records and the like within a predetermined period from the current time at the time of a search for a route, a route search corresponding to changes in road conditions such as temporary road construction and on-street parking can be performed.

In addition, various processors other than the CPU may execute the link information generation process that is executed by the CPU reading software (a program) in each of the embodiments described above. Examples of the processor in such a case include a programmable logic device (PLD) such as a field-programmable gate array (FPGA) of which circuit configuration can be changed after manufacturing, a dedicated electric circuit such as an application specific integrated circuit (ASIC) that is a processor having a circuit configuration designed dedicatedly for executing a specific process. In addition, the link information generation process may be executed by one of such various processors or may be executed by a combination of two or more processors of the same type or different types (for example, a plurality of FPGAs, a combination of a CPU and an FPGA, or the like). More specifically, the hardware structure of such various processors is an electrical circuit acquired by combining circuit devices such as semiconductor devices.

In each of the embodiments described above, although a form in which the link information generation process program is stored (installed) in the ROM 12 or the storage 14 in advance has been described, but not limited thereto. The program may be provided in the form of being stored in a non-transitory storage medium such as a compact disk read only memory (CD-ROM), a digital versatile disk read only memory (DVD-RAM), or a universal serial bus (USB) memory. In addition, the program may be in a form that is downloaded from an external device via a network.

Relating to each of the embodiments described above, the following supplementary notes are disclosed.

Supplementary Note 1

A link information generation device that includes a memory and at least one processor connected to the memory, wherein the processor associates, by a map matching process, pieces of location information of a moving user at certain times with network data which is used for a route search for a pedestrian and formed of a plurality of nodes and a link connecting the nodes; and calculates a passage record of a link of interest as link information based on whether the link of interest is connected to a preceding link or a following link in a link row acquired by aligning links associated with the pieces of location information in chronological order of the pieces of the location information.

Supplementary Note 2

A non-transitory recording medium storing a computer-executable program for executing a link information generation process, in the link information generation process, wherein a map matching unit associates, by a map matching process, pieces of location information of a moving user at certain times with network data which is used for a route search for a pedestrian and formed of a plurality of nodes and a link connecting the nodes; and a calculation unit calculates a passage record of a link of interest as link information based on whether the link of interest is connected to a preceding link or a following link in a link row acquired by aligning links associated with the pieces of location information in chronological order of the pieces of the location information.

REFERENCE SIGNS LIST 10, 210 Link information generation device
11 CPU
12 ROM
13 RAM
14 Storage
15 Input unit
16 Display unit
17 Communication interface
19 Bus
101 Map matching unit
102, 202 Calculation unit
120 Pedestrian network data

The invention claimed is:

1. A link information generation method comprising:
associating pieces of location information of a moving user moving through a route during a predetermined time interval with nodes of a plurality of nodes in network data, wherein the network data is used for a route search for a pedestrian as a type of movement by the moving user, the network data comprises the plurality of nodes and a link connecting a pair of nodes of the plurality of nodes, the pair of nodes comprises a start node and an end node of the link, the link is searchable based on the type of movement and a piece of the pieces of the location information as the start node of the link, and the link includes a road type of the link and a time duration for the pedestrian to move across the link according to the type of movement;
determining link information, wherein the link information represents a passage record of the moving user having passed through a link of a series of links, and the link information is based on aligning links of the series of links in chronological order of the moving user passing through the pieces of the location information;
updating the link information by removing a part of the link information that corresponds to one or more links of the series of links when the one or more links at least either do not connect from a preceding link or do not connect to a subsequent link in the series of links, wherein the part of the link information being removed comprises a link on which the moving user has turned back without passing through the link; and
generating, based on the updated link information, a route for another moving user with the pedestrian as the type of movement to move according to the updated link information.

2. The link information generation method according to claim 1, wherein the determining the link information further comprises determining passage time at nodes located at both ends of a link of interest having a passage record based on a time of the location information associated with a preceding link or a subsequent link connected to the node, and further determines a required time for the link of interest as the link information from the passage time acquired by determining for the nodes located at both ends of the link of interest.

3. The link information generation method according to claim 2, wherein the determining further comprises determining, as the link information, a time cost acquired by statistical processing on a required time for the link of interest acquired by calculating based on location information of a plurality of users.

4. The link information generation method according to claim 2,
wherein road-type information indicated by a link is added to the link, and
the determining further comprises determining, for a link of a predetermined specific road type, a required time for a partial route including two or more links selected from the link of the predetermined specific road type and links connected to nodes located at both ends of the link of the predetermined specific road type.

5. The link information generation method according to claim 2, wherein the determining further comprises determining, as the link information, a subjective cost with a length of a link and a required time for the link as parameters.

6. The link information generation method according to claim 5, wherein the determining further comprises determining the subjective cost that further includes difficulty of walking on a road indicated by the link as a parameter.

7. The link information generation method according to claim 1, wherein the determining further comprises determining the link information for attributes of users.

8. The link information generation method according to claim 1, wherein, among the pieces of the location information during the predetermined time interval, the associating the pieces of the location information comprises making location information whose certainty satisfies a predetermined condition correspond to the network data.

9. A link information generation device comprising a processor configured to execute operations comprising:
associating pieces of location information of a moving user moving through a route during a predetermined time interval with nodes of a plurality of nodes in network data, wherein the network data is used for a route search for a pedestrian as a type of movement by the moving user, the network data comprises the plurality of nodes and a link connecting a pair of nodes of the plurality of nodes, the pair of nodes comprises a start node and an end node of the link, the link is searchable based on the type of movement and a piece of the pieces of the location information as the starting node of the link, and the link includes a road type of the link and a time duration for the pedestrian to move across the link according to the type of movement;
determining link information, wherein the link information represents a passage record of the moving user having passed through a link of a series of links, and the link information is based on aligning links of the series in chronological order of the moving user passing through the pieces of the location information;
updating the link information by removing a part of the link information that corresponds to one or more links of the series of links when the one or more links at least either do not connect from a preceding link or do not connect to a subsequent link in the series of links, wherein the part of the link information being removed comprises a link on which the moving user has turned back without passing through the link; and
generating, based on the updated link information and the network data, a route for another moving user with the pedestrian as the type of movement to move according to the updated link information.

10. The link information generation device according to claim 9, wherein the determining the link information further comprises determining passage time at nodes located at both ends of a link of interest having a passage record based on a time of the location information associated with a preceding link or a subsequent link connected to the node, and further determines a required time for the link of interest as the link information from the passage time acquired by determining for the nodes located at both ends of the link of interest.

11. The link information generation device according to claim 10, wherein the determining further comprises determining, as the link information, a time cost acquired by statistical processing on a required time for the link of interest acquired by calculating based on location information of a plurality of users.

12. The link information generation device according to claim 10,
wherein road-type information indicated by a link is added to the link, and
the determining further comprises determining, for a link of a predetermined specific road type, a required time for a partial route including two or more links selected from the link of the predetermined specific road type and links connected to nodes located at both ends of the link of the predetermined specific road type.

13. The link information generation device according to claim 10, wherein the determining further comprises determining, as the link information, a subjective cost with a length of a link and a required time for the link as parameters.

14. The link information generation device according to claim 13, wherein the determining further comprises determining the subjective cost that further includes difficulty of walking on a road indicated by the link as a parameter.

15. The link information generation device according to claim 9,
wherein the determining further comprises determining the link information for attributes of users.

16. The link information generation device according to claim 9, wherein, among the pieces of the location information during the predetermined time interval, the associating comprises making location information whose certainty satisfies a predetermined condition correspond to the network data.

17. A computer-readable non-transitory recording medium storing computer-executable program instructions that when executed by a processor cause a computer system to perform operations comprising:
associating pieces of location information of a moving user moving through a route during a predetermined time interval with nodes of a plurality of nodes in network data, wherein the network data is used for a route search for a pedestrian as a type of movement by the moving user, the network data comprises the plurality of nodes and a link connecting a pair of nodes of the plurality of nodes, the pair of nodes comprises a start node and an end node of the link, the link is searchable based on the type of movement and a piece of the pieces of the location information as the starting node of the link, and the link includes a road type of the link and a time duration for the pedestrian to move across the link according to the type of movement;
determining link information, wherein the link information represents a passage record of the moving user having passed through a link of a series of links, and the link information is based on aligning links of the series of links in chronological order of the moving user passing through the pieces of the location information;
updating the link information by removing a part of the link information that corresponds to one or more links of the series of links when the one or more links at least either do not connect from a preceding link or do not connect to a subsequent link in the series of links, wherein the part of the link information being removed comprises a link on which the moving user has turned back without passing through the link; and generating, based on the updated link information, a route for another moving user with the pedestrian as the type of movement to move according to the updated link information.

18. The computer-readable non-transitory recording medium according to claim 17, wherein the determining further comprises determining, as the link information, a time cost acquired by statistical processing on a required time for a link of interest acquired by calculating based on location information of a plurality of users.

19. The computer-readable non-transitory recording medium according to claim 17,
   wherein road-type information indicated by a link is added to the link, and
   the determining the link information further comprises determining, for a link of a predetermined specific road type, a required time for a partial route including two or more links selected from the link of the predetermined specific road type and links connected to nodes located at both ends of the link of the predetermined specific road type.

20. The computer-readable non-transitory recording medium according to claim 17, wherein the determining further comprises determining, as the link information, a subjective cost with a length of a link and a required time for the link as parameters.

* * * * *